United States Patent [19]

Knohl

[11] Patent Number: 4,462,730

[45] Date of Patent: Jul. 31, 1984

[54] PAINTED SCREW AND WASHER ASSEMBLIES

[75] Inventor: Rudolph E. Knohl, Bartlett, Ill.

[73] Assignee: Illinois Tool Works Inc., Chicago, Ill.

[21] Appl. No.: 230,218

[22] Filed: Feb. 2, 1981

[51] Int. Cl.³ .............................................. F16B 39/24
[52] U.S. Cl. ................................................. 411/371
[58] Field of Search ..................... 411/156, 371, 372; 10/155 A

[56] References Cited

U.S. PATENT DOCUMENTS

| | | | |
|---|---|---|---|
| 3,523,299 | 8/1970 | Tinnerman | 411/372 |
| 3,777,796 | 12/1973 | Takano | 151/38 |
| 3,862,458 | 1/1975 | Stanaitis | 10/155 A |
| 3,913,649 | 10/1975 | Stanaitis | 151/38 |
| 4,292,007 | 9/1981 | Wagner | 411/156 |

*Primary Examiner*—Robert L. Wolfe
*Attorney, Agent, or Firm*—Thomas W. Buckman; Donald D. Mondul; David I. Roche

[57] ABSTRACT

A pre-assembled fastener and washer which facilitates application of paint to surfaces that would otherwise be exposed. Two annular protrusions formed on the unthreaded shank adjacent the head serve to retain the washer and fastener in an assembled condition with the washer spaced from the fastener head. Once the assembly has been painted and dried, the washer can be moved to its fully assembled position adjacent the fastener head. A method of forming a painted assembly is also disclosed.

8 Claims, 3 Drawing Figures

PAINTED SCREW AND WASHER ASSEMBLIES

BACKGROUND AND SUMMARY OF THE INVENTION

The present invention is directed to painted fastener and washer assemblies. More particularly, the present invention is directed to a fastener and washer assembly which facilitates the application of paint and a method of making a painted assembly.

As the automotive, appliance, and building industries become increasingly corrosion conscious, various ways of preventing fastener corrosion become increasingly important. One way of halting corrosion is to dip or spray coat the assembled fastener and washer to match the color of the exposed panel. Several problems have arisen. First, the washer-fastener interface causes some of the surface area to be difficult to coat. Second, if this difficulty is overcome, when the painted assembly is baked, or dried by other means, the paint in the interface region forms a bond between the two elements of the assembly. Since the washer's primary function is to remain free-spinning thereby preventing marring of the panel beneath, such adhesion is unacceptable.

One solution to this problem is to paint the washers and fasteners before assembly. Unfortunately, this solution creates more problems than it solves. The washers tend to nest and the coverage and adherence problems are more pronounced than with the pre-assembled washers and fasteners due to the larger interface. When the washers are separated after the paint has dried the coating on each is generally marred and both washers must be discarded. Separate inventories of painted fasteners and washers must be maintained for each color, with the possibility of variations in die lots, as well as the concommitant handling problems including the care with which pre-painted elements must be assembled.

The present invention solves these problems. A pair of annular protrusions are formed on the fastener shank between the head and the threads. The washer is then partially assembled with the fastener, the inner peripheral edge of the washer being retained between the two protrusions to hold the washer in spaced relationship with respect to the fastener head. The assembly can now be coated with paint with all the important surfaces being readily accessible for painting. Should the small interface between the inner peripheral edge of the washer and the shank of the fastener be sufficient to cause a paint bond to be formed, movement of the washer to its fully seated position following drying of the paint will break the elements loose and re-establish a free-spinning condition. A method of making this assembly is also disclosed. Other characteristics, features and advantages of the present invention will become apparent after a reading of the following specification.

DETAILED DESCRIPTION OF THE PREFERRED EMBODIMENTS

Figure 1:
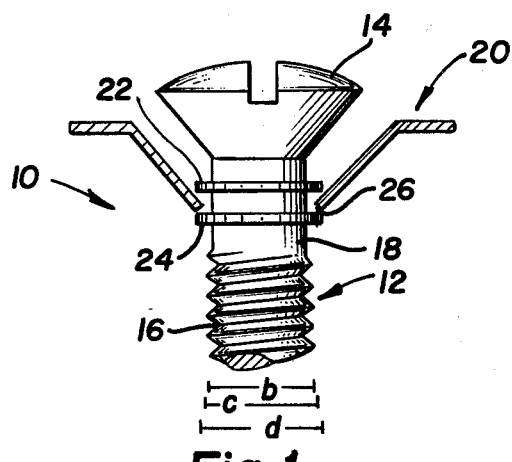
FIG. 1 is a side view of the fastener and washer assembly of the present invention with the washer shown in section in order to show more detail.

The fastener and washer assembly is shown generally at 10. Fastener 12 has a head 14 at one end, a threaded shank portion 16 and an unthreaded shank region 18 intermediate the head and threaded shank. Fastener 12 may be self-drilling and/or self-tapping variety, for example. Further, it may have any known head style or type of thread. Washer 20 will ordinarily have a configuration that generally conforms to the style of head 14 with which it is to be used.

Unthreaded shank region 18 has thereon a first annular protrusion 22 spaced from the head 14 a predetermined amount and a second annular protrusion 24 spaced from said first protrusion 22. The threads on portion 16 have a first predetermined maximum lateral dimension 'b' while each protrusion 22, 24 has a second greater predetermined maximum lateral dimension 'd'. Although it is not necessary, it is preferred that the maximum dimensions of the two protrusions be generally equal. Further, while the protrusions 22, 24 may take a variety of forms, they have been depicted as a pair of annular knurled rings. As disclosed in U.S. patent application Ser. No. 92,150 filed Nov. 7, 1979 and now U.S. Pat. No. 4,292,007, this knurled configuration is preferred in order to reduce the tendency of the ring to sliver during assembly which can create separation and handling problems.

Figure 2:
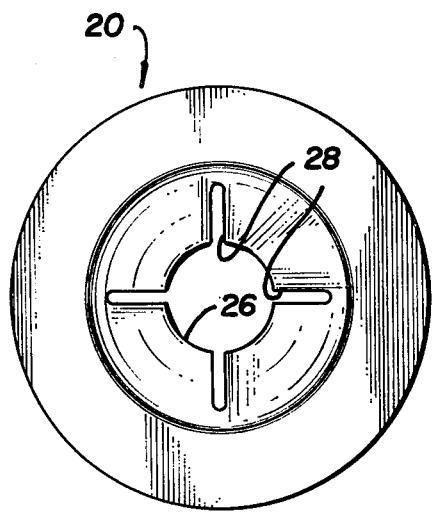
FIG. 2 is a top view of one form of washer which can be used in the assembly shown in FIG. 1.

Washer 20 has a throughbore defined by inner peripheral edge 26. The minimum internal lateral dimension 'c' exceeds thread dimension 'b' but is less than protrusion dimension 'd'. As shown in FIG. 2, slots 28 may be provided extending generally radially outwardly from the hole peripheral edge 26. Such slots increase the washer flexibility in this region enabling the washer to more easily be snapped over the second annular protrusion 24 and, ultimately, the first protrusion 22. These slots secondarily serve as auxiliary passages for paint flow should the depth of the knurls be inadequate for this purpose. Whether or not slots 28 are used depends on a variety of factors including washer configuration, hardness of the fastener, flexibility of the washer, and whether or not it is desired to paint the threaded shank. If it is not, slots 28 can be omitted and the upper and lower surfaces of the fastener head and the upper surface of the washer can be spray painted from above.

In formulating the painted fastener and washer assembly 10 of the present invention, first, washer 20 is partially assembled to fastener 12 to the position shown in FIG. 1. Then, as much as the assembly as is desired may be painted without restriction which might be caused by large interfacing of fastener and washer surfaces. After the coating of paint has been dried (by baking or the like), the washer is snapped over protrusion 22 to the fully seated position. This step may be performed on a dial press, for example or, the final assembly step may occur as the fastener is advanced into the workpiece. This final axial movement between the two elements of the assembly will serve to break any adhesion which may have resulted from painting them in an assembled condition.

Figure 3:
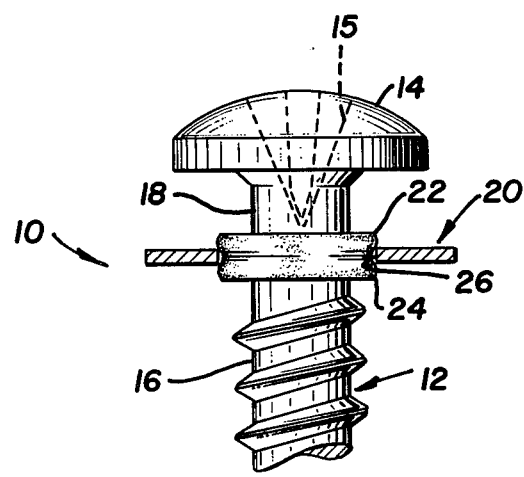
FIG. 3 is a side view of an alternate form of the assembly of the present invention with the washer again being sectioned.

A second form of the invention is depicted in FIG. 3 generally at 10. Fastener 12 and washer 20 each have different shapes from those shown previously. Further, first and second similar protrusions 22, 24 take the form of the upper and lower extremities of a single contoured knurled ring. While the amount of unthreaded shank 18 above protrusion 22 has been exaggerated in order that the recess 15 not confuse the drawing, it will be understood that the distance between the head and protrusion 22 is ordinarily closely controlled to provide a snug fit in the fully assembled position.

Various changes, alterations and modifications will become apparent to one of ordinary skill in the art in view of the foregoing specification. For example, the invention is equally applicable to external drive fastener heads. Accordingly, it is intended that all such changes, alterations and modifications as come within the scope of the following claims be included as part of the present invention.

I claim:

1. A pre-assembled fastener and washer unit comprising a fastener having a shank with threads on a portion thereof and a head at one end said head having an upper and a lower surface, said shank having threads with a first predetermined lateral dimension and, an unthreaded region situated between the threads and side head, a first annular protrusion having a second predetermined lateral dimension greater than the first extending outwardly from said unthreaded shank region, a second annular protrusion having a third predetermined lateral dimension also greater than said first extending outwardly from said unthreaded shank, said second protrusion being spaced farther from the fastener head than said first protrusion, a washer member having an upper and lower surface and a hole passing generally axially therethrough the periphery of the hole having a fourth predetermined lateral dimension which is greater than the first but less than the second and third such that the washer, when assembled with the fastener by passing the periphery of the washer over the threads and forcing the washer over said second protrusion, will be retained between said first and second protrusions at a position spaced from the lower surface of the head so that the upper and lower surfaces of the fastener head and washer will be accessible for painting and the like.

2. The pre-assembled fastener and washer unit of claim 1 wherein the second and third predetermined lateral dimensions are substantially equal.

3. The pre-assembled fastener and washer unit of claim 1 wherein said first and second annular protrusions are knurled rings.

4. The pre-assembled fastener and washer unit of claim 1 wherein said first and second annular protrusions are the upper and lower extremities of a single contoured knurled ring.

5. The pre-assembled fastener and washer unit of claim 1 wherein the washer has a plurality of slots extending radially outwardly from the periphery of the hole in the washer.

6. A method of forming a painted, pre-assembled washer and fastener unit comprising the steps of
   a. providing a threaded, headed fastener with threads of a first predetermined lateral dimension and two annular protuberances positioned between the head and the threads and being spaced from the head each protuberance having a lateral dimension greater than said first dimension;
   b. providing a washer having a hole with a predetermined internal lateral dimension exceeding said first predetermined lateral dimension but being less than the predetermined lateral dimensions of both of the protuberances;
   c. partially assembling the washer to the fastener by pushing it over one of the protuberances such that the washer is retained between the two protuberances at a position spaced from the head of the fastener;
   d. coating at least the upper and lower surfaces of the fastener head and the upper surface of the washer with paint;
   e. drying the coating of paint;
   f. completing the washer assembly by forcing the washer over the other of the protuberances to a position adjacent the fastener head.

7. The method of claim 6 wherein the washer assembly is completed upon insertion of the fastener into a workpiece.

8. The method of claim 6 wherein the entire unit is coated with paint by dip coating.

* * * * *